United States Patent
Khatib

(10) Patent No.: US 9,348,529 B1
(45) Date of Patent: May 24, 2016

(54) PEAK POWER EFFICIENT DATA STORAGE DRIVES

(71) Applicant: HGST Netherlands B.V., Amsterdam (NL)

(72) Inventor: Mohammed Ghiath Khatib, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/606,581

(22) Filed: Jan. 27, 2015

(51) Int. Cl.
*G11B 15/18* (2006.01)
*G11B 5/00* (2006.01)
*G06F 3/06* (2006.01)
*G11B 5/54* (2006.01)

(52) U.S. Cl.
CPC ............ *G06F 3/0625* (2013.01); *G06F 3/0634* (2013.01); *G06F 3/0655* (2013.01); *G06F 3/0688* (2013.01); *G06F 3/0689* (2013.01); *G11B 5/54* (2013.01); *G11B 15/1808* (2013.01)

(58) Field of Classification Search
CPC ........ G11B 5/56; G11B 5/54; G11B 5/59633; G11B 5/6005; G11B 7/126; G11B 7/0045; G11B 20/10527; G11B 7/005; G11B 5/584; G06F 12/0866; G06F 12/0804; G06F 11/1076; G06F 3/0601; G06F 3/0659; G06F 7/1006; G06F 5/0655; G06F 5/1634; G06F 5/0689
USPC .............. 711/100, 104, 113, 114; 360/69, 75; 369/47.5, 47.32
See application file for complete search history.

(56) References Cited

U.S. PATENT DOCUMENTS

| | | | |
|---|---|---|---|
| 7,644,239 B2 | 1/2010 | Ergan et al. | |
| 7,975,095 B2 | 7/2011 | Hsieh et al. | |
| 8,677,084 B2 | 3/2014 | Pyeon | |
| 2004/0174631 A1 | 9/2004 | Tanaka et al. | |
| 2008/0192599 A1* | 8/2008 | Muramatsu | G11B 7/0045 369/47.47 |

FOREIGN PATENT DOCUMENTS

WO    2013032405 A1    3/2013

OTHER PUBLICATIONS

Leong, Yong Khai, NVM and Hybrid Integration, Storage Unlimited, Data Storage Institute, Apr.-Jun. 2012, 4 pages.

(Continued)

*Primary Examiner* — Nabil Hindi

(57) ABSTRACT

To provide enhanced operation of data storage devices and systems, various systems, apparatuses, methods, and software are provided herein. In a first example, a hard disk drive is provided. The hard disk drive includes rotating storage media for storing data and read/write heads positioned over the storage media and configured to write the data to the storage media and read the data from the storage media. The hard disk drive includes a storage control system configured to identify acceleration characteristics associated with the read/write heads. The storage control system is configured to execute storage operations using the read/write heads when the acceleration characteristics indicate a power consumption for the hard disk drive outside a peak power consumption range, and cache the storage operations when the acceleration characteristics indicate the power consumption for the hard disk drive within the peak power consumption range.

20 Claims, 5 Drawing Sheets

(56) References Cited

OTHER PUBLICATIONS

Budiman, Mine et al, "Development of a Hybrid Drive that Combines Large Capacity and High-Speed Performance" retrieved from internet site http://www.design-reuse.com/articles/34974/hybrid-drive-development.html on Oct. 1, 2014, 6 pages.

Product Overview Momentus 5400 PSD, Seagate Technology LLC, Publication No. PO0025.1-0708US, Aug. 2001, 2 pages, United States of America.

WD Black2, retrieved from internet site http://www.wdc.com/en/products/products.aspx?id=1190 on Oct. 1, 2014, 4 pages.

* cited by examiner

PEAK POWER EFFICIENT DATA STORAGE DRIVES

TECHNICAL FIELD

Aspects of the disclosure are related to the field of data storage and hard disk drives in data storage systems.

TECHNICAL BACKGROUND

Computer and network systems such as personal computers, workstations, server systems, and cloud storage systems, typically include data storage elements for storing and retrieving data. These data storage elements can include data storage devices, such as hard disk drives, solid state storage devices, hybrid storage devices, tape storage devices, and other mass storage devices.

To read and write data to rotating media storage drives, such as hard disk drives, read/write heads are employed to magnetically read and write to disk platters. Read/write heads are typically arranged on a movable armature which is positioned across the platter in response to data operations. However, when data operations are spread across the surface of a platter, the armature holding the read/write heads can be forced to make many positional changes to read or write the associated data. This greater movement of the read/write heads in a hard disk drive can lead to increased power consumption of the hard disk drive.

Power is a large concern for data center planning and operations. Improving power efficiency of data centers can allow for increased density in storage layouts and increased data storage performance for the data center. Even if individual hard disk drives in a data center each consume a small amount of power, a few percentage savings in power consumption can be substantial when scaled over an entire data center.

OVERVIEW

To provide enhanced operation of data storage devices and systems, various systems, apparatuses, methods, and software are provided herein. In a first example, a hard disk drive is provided. The hard disk drive includes rotating storage media to store data and read/write heads positioned over the storage media that are configured to write the data to the storage media and read the data from the storage media. The hard disk drive includes a storage control system configured to identify acceleration characteristics associated with the read/write heads. The storage control system is configured to execute storage operations using the read/write heads when the acceleration characteristics associated with the read/write heads indicate a power consumption for the hard disk drive outside a peak power consumption range. The storage control system can also cache the storage operations and any associated data when the acceleration characteristics indicate the power consumption for the hard disk drive within the peak power consumption range.

In a second example, a data storage device configured to store and retrieve data is provided. The data storage device includes storage media that stores the data and a solid-state non-volatile memory (NVM) configured to store at least write operations received for the data storage device. The data storage device also can include or operate with a storage control system configured to identify operational characteristics for the data storage device that correspond to a peak power consumption range for the data storage device. The storage control system is configured to cache the write operations in the NVM when current operational characteristics of the data storage device indicate operation of the data storage device within the peak power consumption range, and execute the write operations from the NVM for storage of associated write data on the storage media when the current operational characteristics of the data storage device indicate operation of the data storage device outside of the peak power consumption range.

In another example, a method of operating a hard disk drive having rotating storage media configured to store data is presented. The method includes identifying acceleration characteristics associated with one or more read/write heads positioned over the storage media that are configured to write the data to the storage media and read the data from the storage media, executing storage operations using the read/write heads when the acceleration characteristics indicate a power consumption for the hard disk drive outside of a peak power consumption range, and caching the storage operations when the acceleration characteristics indicate the power consumption for the hard disk drive within the peak power consumption range.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
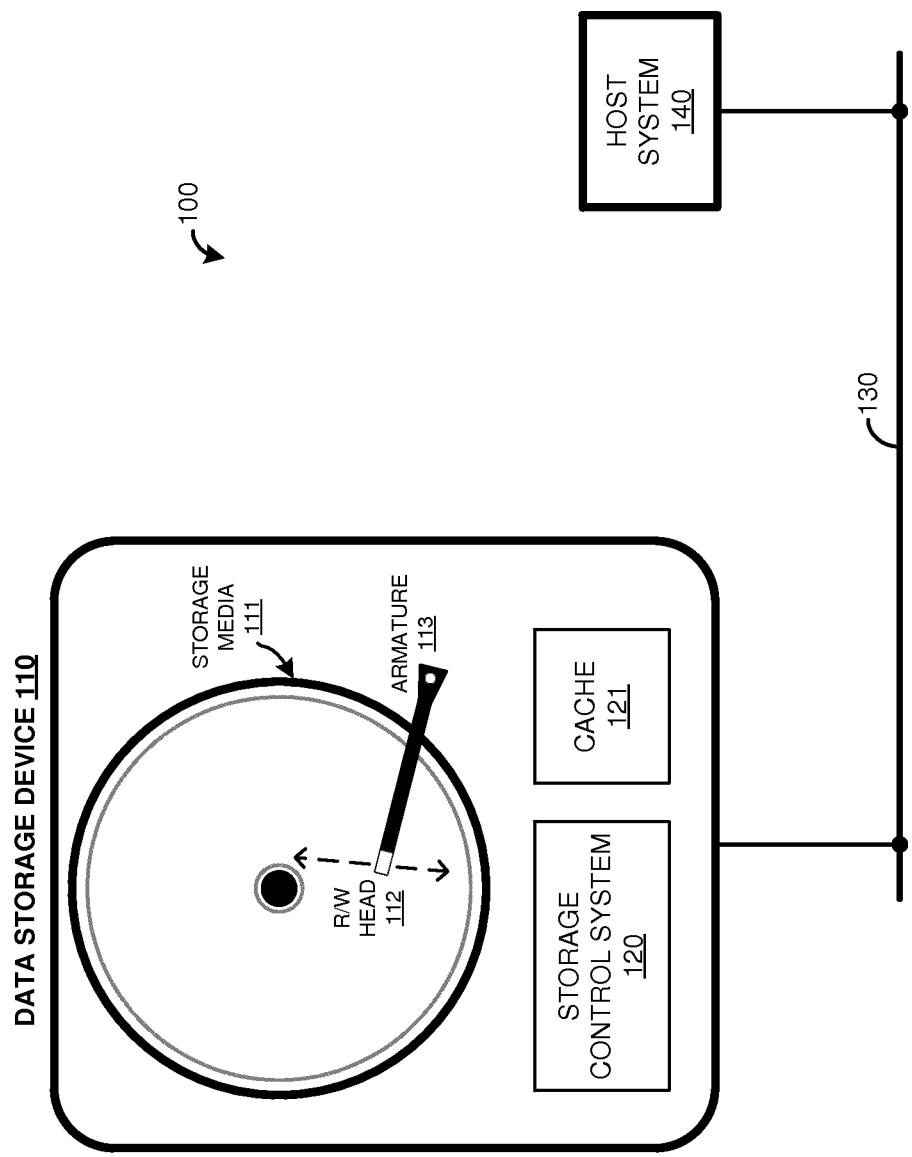
FIG. 1 is a system diagram illustrating a data system.

FIG. 1 is a system diagram illustrating data system 100. System 100 includes data storage device 110 and host system 140. Data storage device 110 and host system 140 communicate over storage interface 130. Data storage device 110 includes data storage elements comprising one or more rotating storage media 111, one or more read/write heads 112, and armature 113. Data storage device 110 also includes cache 121 for caching storage operations, and storage control system 120 which can control the operations of data storage device 110, among other operations.

In operation, data storage device 110 receives read or write operations over storage interface 130 issued by host system 140. Responsive to read operations, data storage device 110 can retrieve data stored upon storage media 111 with read/write (R/W) heads 112 for transfer to host system 140. Responsive to write operations, data storage device 110 stores data onto storage media 111 with R/W heads 112. R/W heads 112 are positioned over different areas of media 111 to read or write associated data using armature 113. It should be understood that other components of data storage device 110 are omitted for clarity in FIG. 1, such as preamps, transceivers, processors, amplifiers, motors, servos, enclosures, and other electrical and mechanical elements.

Figure 2:
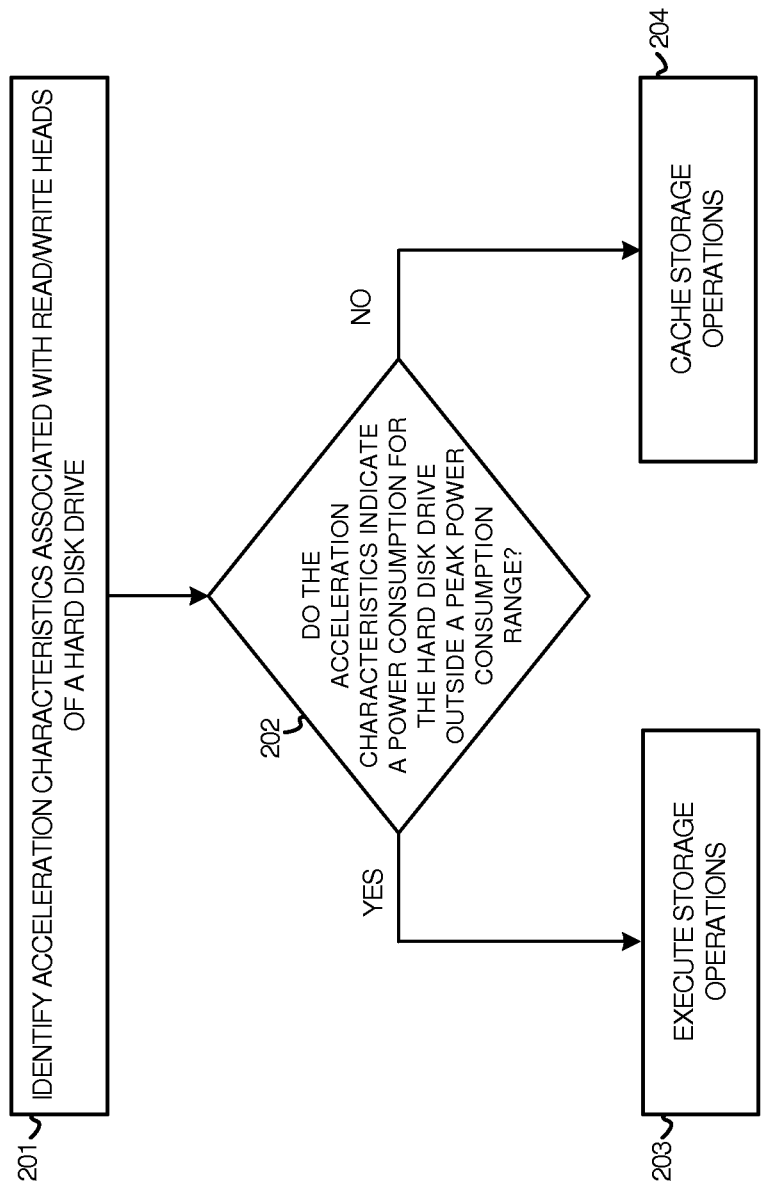
FIG. 2 is a flow diagram illustrating a method of operation of a data storage drive.

To further illustrate the operation of data system 100, FIG. 2 is provided. FIG. 2 is a flow diagram illustrating a method of operating data storage device 110. The operations of FIG. 2 are referenced below parenthetically. In FIG. 2, storage control system 120 identifies (201) acceleration characteristics associated with read/write heads of data storage device 110. In this example, R/W heads 112 are employed to read and write data to and from storage media 111. Armature 113 moves R/W heads 112 over storage media 111 to reach a desired storage location while storage media 111 rotates.

The process of moving R/W heads 112 over storage media 111 requires electrical energy, such as energy to operate a servo or voice coil motor that moves armature 113. This electrical energy contributes to a total power consumption of data storage device 110, and can vary over time due to the changing position of R/W heads 112 over storage media 111 responsive to storage operations.

The acceleration characteristics associated with R/W heads 112 can be due to current storage operations being handled or executed by data storage device 110, such as current read operations or write operations. Changing position of R/W heads 112 from one storage location to another storage location on storage media 111 can correspond to acceleration changes in R/W heads 112 from starting and stopping movement of R/W heads 112. Also, movement of R/W heads 112 from one extreme position, such as the outer edge of storage media 111, to another extreme position, such as the inner edge of storage media 111, can lead to greater energy use or power consumption than smaller positional movements. Smaller positional movements to different storage locations over storage media 111 can thus lead to smaller acceleration characteristics associated with R/W heads 112 and lesser power consumption for data storage device 110.

The acceleration characteristics associated with R/W heads 112 can also be affected by projected acceleration characteristics due to storage operations that have not yet been executed, such as those cached in cache 121. Data storage device 110 can calculate projected power consumption based on estimated acceleration characteristics associated with R/W heads 112 for storage operations cached in cache 121.

When the acceleration characteristics, whether projected or current, indicate a power consumption for data storage device 110 outside of a peak power consumption range (202), then storage control system 120 executes (203) storage operations for data storage device 110. Execution of the storage operations can include reading data from storage media 111 for read operations or writing data to storage media 111 for write operations. These storage operations can be those presently received by data storage device 110 or those already cached in cache 121, including combinations thereof.

A peak power consumption range can be identified for data storage device 110. The peak power consumption range, in this example, is an operational mode that is not desired for data storage device 110, in part because data storage device 110 consumes more power than a predetermined power threshold. The peak power consumption range is based in part on operational characteristics associated with R/W heads 112, such as acceleration characteristics, positional characteristics, or throughput characteristics. When rapid accelerations or greater positional changes occur for R/W heads 112, then a corresponding peak power consumption can occur. The rapid acceleration changes might not correspond to a maximum throughput of data storage device 110, and instead may be at a lower throughput than the peak throughput of data storage device 110.

In many of the examples discussed herein, the acceleration characteristics are monitored based in part on a quantity of Input/Output Operations per Second (IOPS) being handled by data storage device 110. The IOPS can indicate a current level of activity or throughput of data storage device 110, which relates to acceleration characteristics for R/W heads 112. A further discussion of the relationship between IOPS and power consumption is included below for FIG. 5.

When the acceleration characteristics indicate a power consumption for data storage device 110 within the peak power consumption range (202), then storage control system 120 caches (204) storage operations for data storage device 110. Read operations or write operations among the storage operations can be cached, including combinations thereof. Read operations might be cached in a different cache location than write operations, although similar circuitry can be employed. The read operations can each include read instructions for data storage device 110 to retrieve data stored on storage media 111, with the data stored in a location on storage media 111 indicated by the read instruction. The write operations can each include write instructions for data storage device 110 to write data stored on storage media 111, with the data to be written included in the write instruction. Cached write operations can include the write instruction indicating the storage location and any associated write data. Cached read operations can include the read instruction indicating the storage location.

The storage operations remain cached in cache 121 until the acceleration characteristics indicate the power consumption for data storage device 110 is not within the peak power consumption range. The acceleration characteristics can be determined from both currently executing storage operations as well as a quantity of storage operations currently cached in cache 121.

When the acceleration characteristics are determined based on IOPS for data storage device 110, then a current IOPS metric for storage operations currently being handled by R/W heads 112 of data storage device 110 and quantity of cached storage operations can be combined to identify a projected IOPS for data storage device 110. If the projected IOPS for data storage device 110 indicates acceleration characteristics outside of the peak power consumption range, then the storage operations held in cache 121 are executed using R/W heads 112. A continual monitoring of current acceleration characteristics for R/W heads 112 and projected acceleration characteristics for R/W heads 112 can be maintained by storage control system 120 to identify when to execute cached storage operations or hold storage operations from being executed.

Advantageously, data storage device 110 can operate with a power consumption that does not enter into an undesirable peak power consumption range. In many examples, the peak power consumption range does not correspond to a maximum throughput (such as in IOPS) for data storage device 110, and instead corresponds to a mid-level throughput for data storage device 110. This mid-level throughput can consume more power than a higher throughput due to greater acceleration starts/stops of R/W heads 112 causing greater power draw. Empirical testing or theoretical modeling can establish the various ranges for power consumption that occur for data storage device 110 under different acceleration characteristics for R/W heads 112 as well as during different levels of IOPS.

Figure 3:
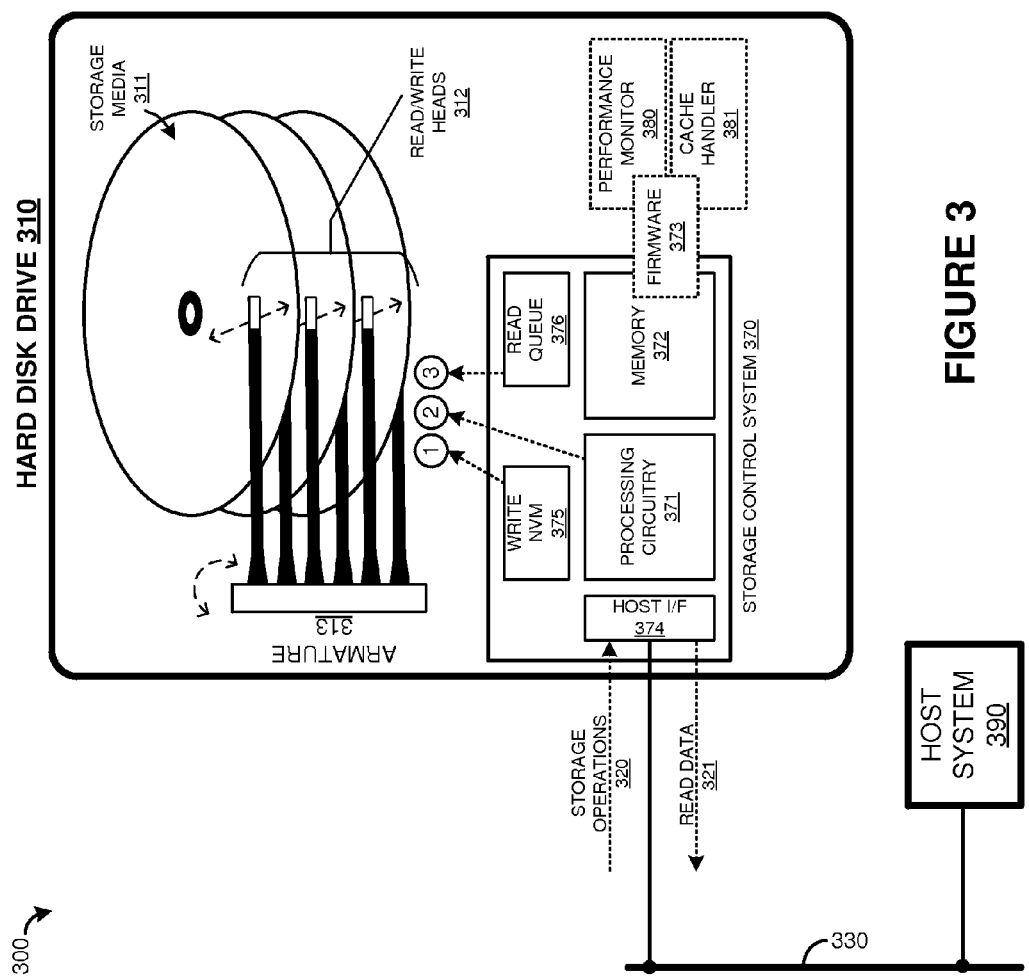
FIG. 3 is a system diagram illustrating a data system.

As a further example data storage system employing a data storage drive, FIG. 3 is presented. FIG. 3 is a system diagram illustrating data storage system 300. Data storage system 300 includes hard disk drive (HDD) 310 and host system 390. HDD 310 and host system 390 communicate over storage link 330. Various elements of HDD 310 can be included in data storage device 110 of FIG. 1, although variations are possible.

Storage link 330 can include one or more links, although a combined link is shown in FIG. 3. Storage link 330 can comprise a storage or disk interface, such as Serial Attached ATA (SATA), Serial Attached SCSI (SAS), FibreChannel, Universal Serial Bus (USB), SCSI, InfiniBand, Peripheral Component Interconnect Express (PCIe), Ethernet, Internet Protocol (IP), or other parallel or serial storage or peripheral interfaces, including variations and combinations thereof.

Host system 390 can include one or more computing and network systems, such as personal computers, servers, cloud storage systems, packet networks, management systems, or other computer and network systems, including combinations and variations thereof. In operation, host system 390 issues read and write commands to HDD 310 over storage link 330.

HDD 310 includes storage media 311, R/W heads 312, armature 313, and storage control system 370. Storage control system 370 includes processing circuitry 371, memory 372, host interface (I/F) 374, write non-volatile memory (NVM) 375, and read queue 376. It should be understood that other components of HD 310 are omitted for clarity in FIG. 3, such as preamps, amplifiers, motors, servos, enclosures, and other electrical and mechanical elements. Furthermore, storage control system 370 includes firmware 373 which includes performance monitor 380 and cache handler 381 which, when executed by at least processing circuitry 371, operates as described below.

Host interface 374 includes one or more storage interfaces for communicating with host systems, networks, and the like. Host interface 374 can comprise transceivers, interface circuitry, connectors, buffers, microcontrollers, and other interface equipment.

Write NVM 375 includes one or more solid-state non-volatile computer readable memory devices. Write NVM 375 can include SRAM, flash memory, magnetic RAM, phase change memory, resistive random-access memory (ReRAM), among other memory technologies, including low-power versions of the aforementioned memory devices. Read queue 376 includes one or more non-transitory computer readable memory devices. Read queue 376 can include RAM, SRAM, flash memory, magnetic RAM, phase change memory, ReRAM, among other memory technologies. In some examples, write NVM 375 and read queue 376 are included in the same one or more non-volatile memory devices. For example, write NVM 375 and read queue 376 can be included in a non-volatile memory device used for caching storage operations in a hybrid hard disk drive. NVM 375 and read queue 376 can be included in elements of host interface 374, processing circuitry 371, or memory 372.

Write NVM 375 and read queue 376 are each employed as cache storage locations for storage operations received over host interface 374. Write NVM 375 stores one or more write operations for handling by HDD 310. For example, write NVM 375 is configured to store write commands received over link 330 for processing by storage control system 370. Since write NVM 375 comprises non-volatile storage, any write operations cached therein can withstand power loss for HDD 310. Read queue 376 stores one or more read operations for handling by HDD 310. For example, read queue 376 is configured to store read commands received over link 330 for processing by storage control system 370.

Storage control system 370 also includes processing circuitry 371 and memory 372. Processing circuitry 371 can comprise one or more microprocessors and other circuitry that retrieves and executes firmware 373 from memory 372. Processing circuitry 371 can be implemented within a single processing device but can also be distributed across multiple processing devices or sub-systems that cooperate in executing program instructions. Examples of processing circuitry 371 include general purpose central processing units, application specific processors, and logic devices, as well as any other type of processing device, combinations, or variations thereof.

Memory 372 can comprise any non-transitory computer readable storage media readable by processing circuitry 371 and capable of storing firmware 373. Memory 372 can include volatile and nonvolatile, removable and non-removable media implemented in any method or technology for storage of information, such as computer readable instructions, data structures, program modules, or other data. In addition to storage media, in some implementations memory 372 can also include communication media over which firmware 373 can be communicated. Memory 372 can be implemented as a single storage device but can also be implemented across multiple storage devices or sub-systems co-located or distributed relative to each other. Memory 372 can comprise additional elements, such as a controller, capable of communicating with processing circuitry 371. Examples of storage media of memory 372 include random access memory, read only memory, magnetic disks, optical disks, flash memory, phase change memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Firmware 373, performance monitor 380, and cache handler 381 can be implemented in program instructions and among other functions can, when executed by HDD 310 in general or processing circuitry 371 in particular, direct HDD 310 or processing circuitry 371 to operate as described herein. Firmware 373 and zoning module 380 can include additional processes, programs, or components, such as operating system software, database software, or application software. Firmware 373, performance monitor 380, and cache handler 381 can also comprise software or some other form of machine-readable processing instructions executable by processing circuitry 371. In at least one implementation, the program instructions can include first program instructions that direct storage control system 370 to identify acceleration characteristics associated with R/W heads 312, execute storage operations using R/W heads 312 when the acceleration characteristics indicate a power consumption for hard disk drive 310 outside a peak power consumption range, and cache the storage operations when the acceleration characteristics indicate the power consumption for hard disk drive 310 within the peak power consumption range, among other operations.

In general, firmware 373 can, when loaded into processing circuitry 371 and executed, transform processing circuitry 371 overall from a general-purpose computing system into a special-purpose computing system customized to operate as described herein. Encoding firmware 373 on memory 372 can transform the physical structure of memory 372. The specific transformation of the physical structure can depend on various factors in different implementations of this description.

Examples of such factors can include, but are not limited to the technology used to implement the storage media of memory 372 and whether the computer-storage media are characterized as primary or secondary storage. For example, if the computer-storage media are implemented as semiconductor-based memory, firmware 373 can transform the physical state of the semiconductor memory when the program is encoded therein. For example, firmware 373 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 4:
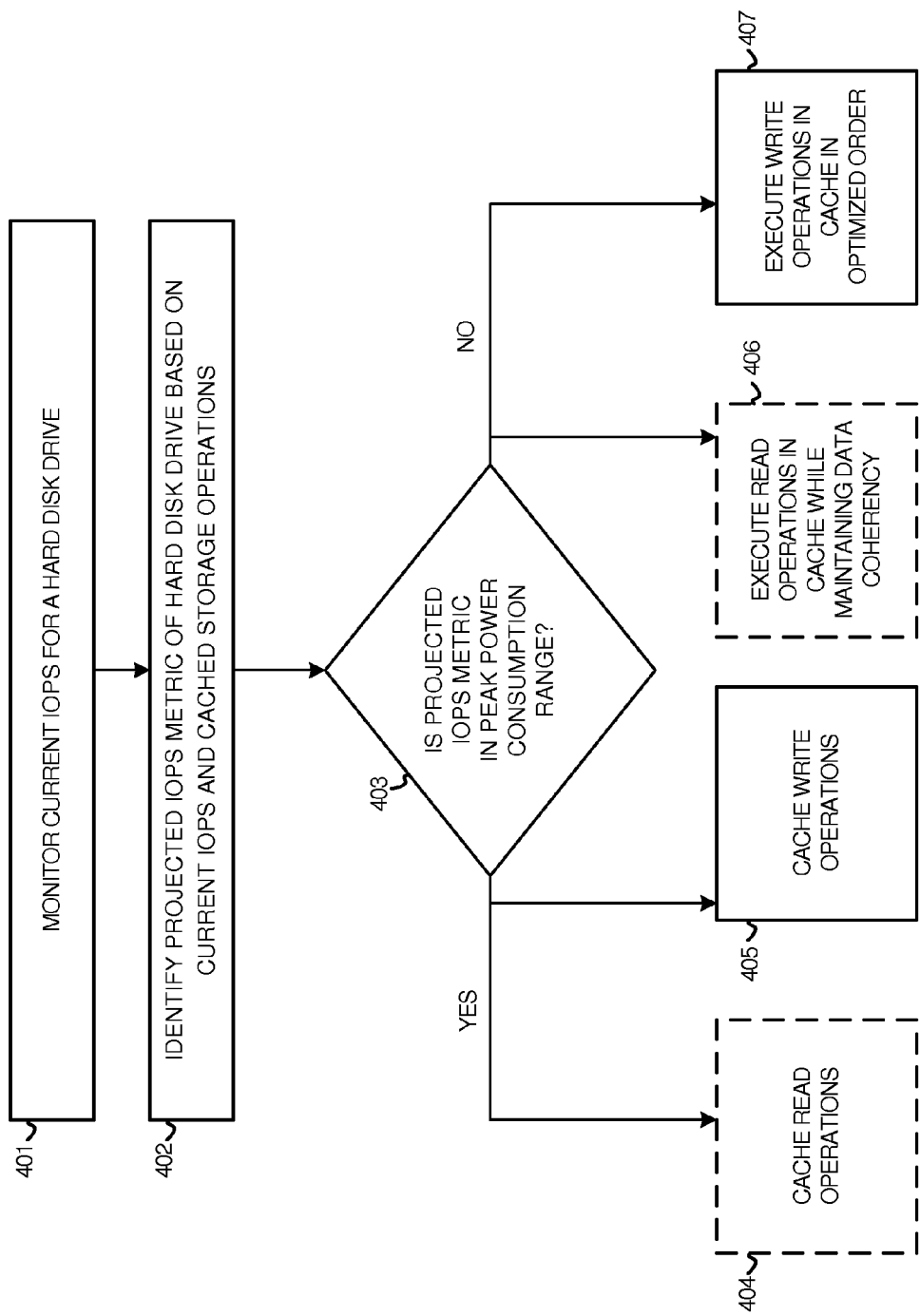
FIG. 4 is a flow diagram illustrating a method of operation of a hard disk drive.

To further illustrate the operation of system 300 and HDD 310, FIG. 4 is presented. FIG. 4 is a flow diagram illustrating a method of operation of HDD 310. The operations of FIG. 4 are referenced below parenthetically. In FIG. 4, storage control system 370 monitors (401) current storage operations per second, such as using a Input/Output Operations per Second (IOPS) metric for HDD 310. The current IOPS can indicate a current number of storage operations being currently handled by processing circuitry 371 using R/W heads 312, such as reading from and writing to storage media 311.

Storage control system 370 identifies (402) a projected IOPS metric of HDD 310 based on current IOPS and a quantity of cached storage operations. A number of storage operations can be received by HDD 310 and cached in an associated one of write NVM 375 and read queue 376. These cached storage operations can reach a quantity, that when executed by storage control system 370, can produce a desired level of IOPS for HDD 310. The quantity of cached storage operations and a measure of the current IOPS can be combined to determine the projected IOPS metric for HDD 310. When HDD 310 is not currently executing any storage operations, then the quantity of cached storage operations alone can be used to determine the projected IOPS metric. However, when HDD 310 is currently executing some storage operations, then storage control system 370 includes both the current IOPS and a quantity of cached storage operations to determine the projected IOPS metric for HDD 310.

It should be noted that executing a storage operation comprises moving R/W heads 312 to an associated location on storage media 311 for reading of data from storage media 311 (for read operations) or writing of data to storage media 311 (for write operations). The act of executing storage operations, and consequently moving R/W heads 312, has a variable power consumption associated therewith. In this example, a peak power consumption range for HDD 310 is identified which corresponds to the greatest amount of power draw for HDD 310.

Figure 5:
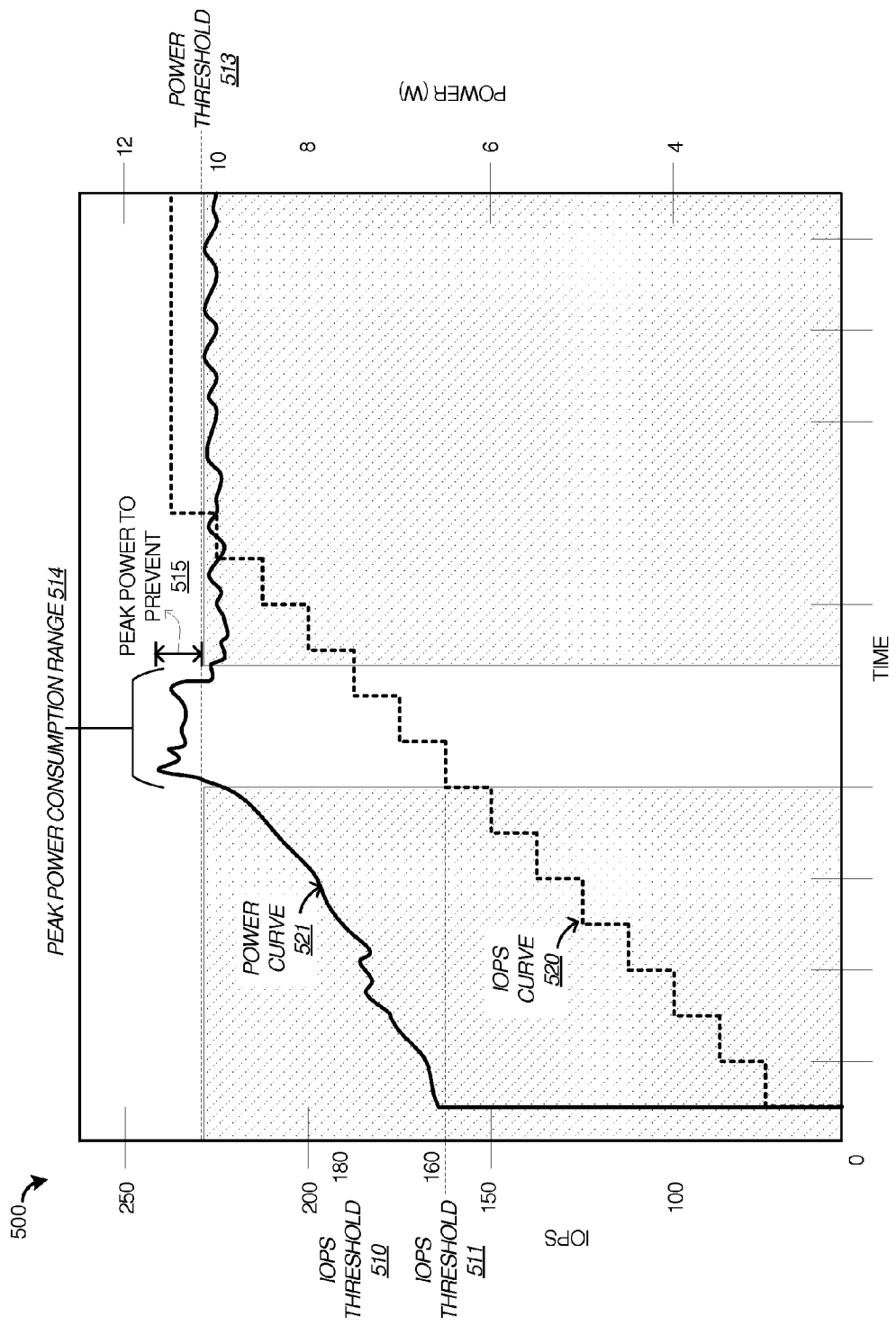
FIG. 5 is a diagram illustrating a power consumption characteristics for a hard disk drive.

As an example of a peak power consumption range for HDD 310, among other data storage devices, FIG. 5 is presented. FIG. 5 is a diagram illustrating various power consumption metrics for a data storage device, shown in graph 500. Graph 500 includes a horizontal axis representative of time, and two vertical axes—a first vertical axis on the left indicating an IOPS metric and a second vertical axis on the right indicating a power consumption amount, in watts. Graph 500 indicates power consumption characteristics as related to an IOPS metric.

Graph 500 can be determined by testing or modeling a data storage device to identify power consumption over various levels of IOPS. IOPS curve 520 corresponds to a current quantity of IOPS being handed by a data storage device, while power curve 521 corresponds to the power consumption for the data storage device. It can be seen that as the number of IOPS increases, a power consumption also increases. However, there is a peak power consumption range 514 for the data storage device which corresponds to a range of IOPS. In this example, peak power consumption range 514 corresponds to an IOPS range of 160-180 IOPS, although this range can vary based on the data storage device.

FIG. 5 indicates a peak power amount that is to be avoided (515) during operation of the associated data storage device, where the power consumption curve 521 exceeds power threshold 513. Power threshold 513 can be established based on a target power consumption desired for the data storage device, or can be based on empirical testing or modeling which reveals a peak in power consumption for a certain range of IOPS, such as in FIG. 5. The amount of power consumption avoided may be a small amount for a particular data storage device, but when aggregated over an entire data center, the amount can be substantial.

It can also be seen in graph 500, that once upper IOPS threshold 510 is reached, that power consumption for the associated data storage device drops from the peak range to below power threshold 513. The peak in power consumption can be related to an increase in start/stop events of R/W heads of a data storage device, such as when actuated by a voice coil motor which draws electrical current during positioning of R/W heads. Acceleration and deceleration of R/W heads consume more power than an unmoving R/W head, and large movements of R/W heads across larger portions of a storage media can also consume more power than shorter movements.

When a level of IOPS is low, such as below IOPS threshold 511, the movement and acceleration of R/W heads can be low simply due to a low number of storage operations being handled. However, when a level of IOPS is high, such as above IOPS threshold 510, the movement and acceleration of R/W heads can also be lower than a peak acceleration. This lower acceleration can be due to shorter movements in between consecutive storage operations over the storage media from having more storage operations located closer together over the storage media. The mid-range of IOPS—between threshold 510 and 511—consumes the greatest power due to a high number of storage operations, yet still having relatively large movements of the R/W heads over the storage media.

Returning now to FIGS. 3 and 4, when the projected IOPS metric is within a peak power consumption range (403) for HDD 310, then storage control system 370 caches storage operations 320 received over link 330. As mentioned in the discussion above for FIG. 5, a peak power consumption range can be identified for HDD 310, which can correspond to a range of acceleration characteristics of R/W heads 312 due to a level of IOPS being executed by HDD 310. The projected IOPS metric is compared to a range of IOPS for HDD 310 that correspond to the peak power consumption range.

When the projected IOPS metric falls within the peak power consumption range, then incoming storage operations are cached by storage control system 370. In FIG. 3, storage operations 320 can comprise read operations and write operations. Storage control system 370 caches (404) read operations in read queue 376, and caches (405) write operations in write NVM 375. Storage control system 370 will continue to cache storage operations until the projected IOPS metric falls outside of the peak power consumption range.

When the projected IOPS metric is not within a peak power consumption range (403) for HDD 310, then storage control system 370 executes cached storage operations. Specifically, storage control system 370 executes (406) read operations cached in read queue 376, and executes (407) write operations in write NVM 375, along with any incoming storage operations.

The acceleration characteristics for R/W heads 312 can be ensured to be outside of the peak power consumption range for HDD 310 when a sufficient quantity of storage operations have been cached that can sustain an IOPS level above an upper IOPS threshold. When the projected IOPS metric exceeds a threshold level, then a burst of storage operations can be executed which purges cached storage operations from the associated caches, where the burst establishes the executed IOPS above the upper IOPS threshold. When the projected IOPS metric exceeds the threshold level, a flush signal can be indicated to cache handler 381 by performance monitor 380 to indicate that a burst of storage operations can be executed or committed.

The burst of storage operations can also be selected to be of a particular execution order. This order can be an order of receipt by HDD 310, or can be a different execution order. For example, an execution order of cached storage operations can be selected based on minimizing acceleration and deceleration events of R/W heads 312, such as minimizing travel distance of R/W heads 312 over storage media 311 between each individual storage operation. Thus, an execution order can be selected by storage control system 370 for the cached storage operations, such as write operations in write NVM 375, that establishes the acceleration characteristics for R/W heads 312 to have a projected power consumption for HDD 310 outside the peak power consumption range.

The execution order can also take into account data coherency to maintain proper order when read operations and write operations occur to the same storage location. For example, if a read operation is held in read queue 376 while a write operation is held in write NVM 375, it must be ensured that proper data is returned to host system 390 based on the order in which the read operation and write operation are received by HDD 310. In some occasions, a read operation is received for data that is currently cached in write NVM 375. In this case, the read operation can be serviced directly from write NVM 375 instead of waiting for the data to be committed to storage media 311 first.

Advantageously, HDD 310 can operate with a power consumption that does not enter into an undesirable peak power consumption range. In many examples, the peak power consumption range does not correspond to a maximum IOPS for HDD 310, such as seen in FIG. 5, and instead corresponds to a mid-level IOPS for HDD 310. This mid-level IOPS can consume more power than a higher IOPS value due to a greater number of acceleration starts/stops or larger movements of R/W heads 312 causing greater power draw by HDD 310. Additionally, an execution order can be selected for cached storage operations which minimizes acceleration and deceleration events of R/W heads 312 or minimizes angular movement of R/W heads 312 across storage media 311 in between successively executed storage operations. This leads to enhanced peak-power efficiency and improved operation of a data storage device.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A hard disk drive, comprising:
rotating storage media configured to store data;
one or more read/write heads positioned over the storage media and configured to write the data to the storage media and read the data from the storage media;
a storage control system configured to identify acceleration characteristics associated with the read/write heads; and
the storage control system configured to execute storage operations using the read/write heads when the acceleration characteristics indicate a power consumption for the hard disk drive outside of a peak power consumption range, and cache the storage operations when the acceleration characteristics indicate the power consumption for the hard disk drive within the peak power consumption range.

2. The hard disk drive of claim 1, comprising:
the storage control system configured to monitor current acceleration characteristics associated with the read/write heads; and
the storage control system configured to process the current acceleration characteristics and a quantity of cached storage operations to identify the acceleration characteristics associated with the read/write heads.

3. The hard disk drive of claim 2, wherein the acceleration characteristics indicate a burst execution of at least the cached storage operations that correspond to a projected power consumption for the hard disk drive outside the peak power consumption range.

4. The hard disk drive of claim 1, comprising:
the storage control system configured to identify the acceleration characteristics associated with the read/write heads based at least in part on a projected Input/Output Operations Per Second (IOPS) metric for the hard disk drive.

5. The hard disk drive of claim 4, comprising:
the storage control system configured to monitor a current IOPS for the hard disk drive;
the storage control system configured to process the current IOPS and a quantity of cached storage operations to identify the projected IOPS metric.

6. The hard disk drive of claim 5, comprising:
wherein the projected IOPS metric allows for a burst execution of the storage operations above an IOPS threshold that corresponds to a projected power consumption for the hard disk drive outside the peak power consumption range.

7. The hard disk drive of claim 1, comprising:
the storage control system configured to cache write operations of the storage operations in non-volatile memory when the acceleration characteristics indicate the power consumption for the hard disk drive within the peak power consumption range, and execute cached write operations from the non-volatile memory when the acceleration characteristics indicate the power consumption for the hard disk drive outside the peak power consumption range.

8. The hard disk drive of claim 6, comprising:
the storage control system configured to select an execution order for the cached write operations that establishes the acceleration characteristics to have a projected power consumption for the hard disk drive outside the peak power consumption range.

9. The hard disk drive of claim 8, wherein the execution order for the cached write operations is selected based in part on minimizing acceleration events of the read/write heads.

10. The hard disk drive of claim 6, comprising:
the storage control system configured to select an execution order for the cached write operations and for cached read operations of the storage operations that establishes the acceleration characteristics to have a projected power consumption for the hard disk drive outside the peak power consumption range and maintains data coherency among the cached write operations and the cached read operations.

11. A data storage device configured to store and retrieve data, the data storage device comprising:
storage media that stores the data;
a non-volatile memory (NVM) configured to store at least write operations received for the data storage device;
a storage control system configured to identify operational characteristics for the data storage device that correspond to a peak power consumption range for the data storage device; and
the storage control system configured to cache the write operations in the NVM when current operational characteristics of the data storage device indicate operation of the data storage device within the peak power consumption range, and execute the write operations from the NVM for storage of associated write data on the storage media when the current operational characteristics of the data storage device indicate operation of the data storage device outside of the peak power consumption range.

12. The data storage device of claim 11, wherein the operational characteristics comprise acceleration characteristics for read/write heads associated with the storage media; and comprising:
the storage control system configured to monitor current acceleration characteristics associated with the read/write heads; and
the storage control system configured to process the current acceleration characteristics and a quantity of the write operations cached in the NVM to identify the acceleration characteristics associated with the read/write heads.

13. The data storage device of claim 12, wherein the acceleration characteristics indicate a burst execution of at least the write operations cached in the NVM that correspond to a projected power consumption for the data storage device outside the peak power consumption range.

14. The data storage device of claim 11, comprising:
the storage control system configured to identify the operational characteristics based at least in part on a projected Input/Output Operations Per Second (IOPS) metric for the data storage device.

15. The data storage device of claim 14, comprising:
the storage control system configured to monitor a current IOPS for the data storage device for storage operations currently being executed by the data storage device;
the storage control system configured to process the current IOPS and at least a quantity of the write operations cached in the NVM to identify the projected IOPS metric.

16. The data storage device of claim 15, comprising:
wherein the projected IOPS metric allows for a burst execution of at least the write operations cached in the NVM above an IOPS threshold that corresponds to a projected power consumption for the data storage device outside the peak power consumption range.

17. The data storage device of claim 11, comprising:
the storage control system configured to select an execution order for the write operations cached in the NVM to have a projected power consumption for the data storage device outside the peak power consumption range.

18. The data storage device of claim 17, wherein the execution order for the write operations cached in the NVM is selected based in part on minimizing acceleration events of a read/write heads associated with the storage media.

19. A method of operating a hard disk drive having rotating storage media configured to store data, the method comprising:
in a storage control system, identifying acceleration characteristics associated with one or more read/write heads positioned over the storage media that are configured to write the data to the storage media and read the data from the storage media;
in the storage control system, executing storage operations using the read/write heads when the acceleration characteristics indicate a power consumption for the hard disk drive outside of a peak power consumption range; and
in the storage control system, caching the storage operations when the acceleration characteristics indicate the power consumption for the hard disk drive within the peak power consumption range.

20. The method of claim 19, further comprising:
in the storage control system, identifying the acceleration characteristics associated with the read/write heads based at least in part on a projected Input/Output Operations Per Second (IOPS) metric for the hard disk drive;
in the storage control system, monitoring a current IOPS for the hard disk drive;
in the storage control system, processing the current IOPS and a quantity of cached storage operations to identify the projected IOPS metric, wherein the projected IOPS metric allows for a burst execution of the storage operations above an IOPS threshold that corresponds to a projected power consumption for the hard disk drive outside the peak power consumption range.

* * * * *